United States Patent Office 3,091,602
Patented May 28, 1963

3,091,602
POLYMERIZATION SHORTSTOPPING
Glenn R. Himes and Harold O. Spang, Torrance, Calif., assignors to Shell Oil Company, New York, N.Y., a corporation of Delaware
No Drawing. Filed Dec. 5, 1960, Ser. No. 73,549
4 Claims. (Cl. 260—84.3)

This invention relates to an improvement in the process for polymerizing unsaturated compounds while dispersed in an aqueous emulsion and to a composition used in the process. More particularly, the invention relates to a new and improved process for terminating or "shortstopping" polymerizations and to a new and improved non-staining, non-discoloring shortstop composition.

Specifically, the invention provides a process for termination of the free-radical induced polymerization of a monomeric material in emulsion comprising unsaturated polymerizable monomers having a $CH_2=C<$ terminal group which comprises adding to said emulsion after the beginning of the polymerization and prior to completion thereof, a combination of substances consisting of (1) a water-soluble salt of a dithiocarbamic acid and (2) a hydrazine, substance (1) being added in amounts of from 0.03 to 0.15% by weight and substance (2) being added in amounts from 0.02 to 0.20% by weight, both substances based on the weight of monomer initially present in said emulsion. The invention further provides a polymerization terminating agent consisting of a hydrazine and an alkali metal salt of a dialkyl dithiocarbamic acid.

In the emulsion polymerization of monomeric materials in the presence of free-radical initiators such as peroxy compounds, especially a butadiene-styrene mixture and similar comonomer systems, it is generally desirable to halt the reaction when a predetermined degree of conversion has been obtained. Such termination of the polymerization is usually effected by substances known as shortstopping agents, introduced into the reaction mixture when the desired conversion of monomers has been reached.

Termination of polymerization reactions has been accomplished heretofore by the use of a great variety of compounds, such as hydroquinone, quinone, and other quinoid-type compounds, and others. Other conventional commercial non-staining shortstops consist of a water-soluble salt of a dithiocarbamic acid as, for example, alkali metal salts of a dialkyl dithiocarbamic acid such as sodium dimethyl dithiocarbamate, or a mixture of a water-soluble salt of a dithiocarbamic acid and a polysulfide as, for example, sodium polysulfide. However, the employement of these compounds in emulsion polymerization reactions lead to undesired color formation. Dialkyl dithiocarbamate salts are known to be contributors of poor color to polymers, particularly rubbery copolymers of styrene and butadiene (SBR), because of their tendency to form highly colored complexes with ferrous and ferric ions, which are present as part per million (p.p.m.) impurities. The use of sodium dimethyl dithiocarbamate (SDD) alone in a typical hot SBR recipe produces a relatively dull tan or gray polymer with an APHA color of 30 to 90. Obviously there is increasing need to find a shortstop which has adequate shortstopping ability, but does not impart color to the polymer, where a light-colored polymer is required or more acceptable, as for example, white sidewalls for tires, hospital sheeting, and high-impact styrene. Hydrazine itself exhibits no appreciable shortstopping action when used alone. Similarly, SDD when used alone will not function as an effective shortstop at a level below about 0.08 p.h.m.

It is an object of the invention to polymerize unsaturated organic compounds. Another object of the invention is to produce an improved polymer. A further object of the invention is to produce a new and improved synthetic rubber. A further object of the invention is to stop an aqueous polymerization. Still another object of the invention is to polymerize a monomeric material in aqueous emulsion and completely stop the polymerization after any desired extent of conversion of the monomers to polymer. Still another object of the invention is to polymerize unsaturated hydrocarbons and produce an uncolored polymer. Still a further object of the invention is to produce a new and useful polymerization shortstopping agent. Still a further object of the invention is to produce a polymerization shortstopping agent which produces an uncolored polymer. Other objects and advantages of the invention will become apparent to one skilled in the art from the accompanying disclosure and discussion.

It has been discovered that these and other objects may be accomplished by the process which comprises polymerizing an unsaturated monomer in an aqueous emulsion and then adding to said emulsion after the beginning of the polymerization and prior to completion thereof, a combination of substances consisting of (1) a water-soluble salt of a dithiocarbamic acid and (2) a hydrazine, substance (1) being added in amounts of from 0.03 to 0.15% by weight and substance (2) being added in amounts from 0.02 to 0.20% by weight, both substances based on the weight of monomer initally present in said emulsion.

We have made the discovery that hydrazine, itself incapable of shortstopping polymerizations, has the property of greatly increasing the effectiveness of previously known dialkyl dithiocarbamates as shortstopping agents. Further, we have also discovered that the mixed hydrazine-sodium dimethyl dithiocarbamate shortstop imparts superior color properties to rubbery polymers, and more particularly to the persulfate-catalyzed hot SBR and redox sulfoxylated cold SBR latices, over the SDD shortstop used alone. Therefore, such hydrazine has been found to exert a synergistic effect upon the previously known shortstops of sodium and potassium dimethyl dithiocarbamate. Such hydrazine we refer to as a synergist.

We have found that while 0.20 part per hundred of monomer (p.h.m.) hydrazine exhibited no apparent shortstopping action when used as the sole shortstop, the addition of as little as 0.03 p.h.m. SDD made an effective shortstop. Conversely, SDD used alone in amounts below 0.08 p.h.m. does not effectively stop polymerization; however, the addition of as little as 0.02 p.h.m. hydrazine to 0.06 p.h.m. SDD produced pronounced shortstopping action and improved color.

The polymers which may be substantially improved in color properties by our invention are polymers of the unsaturated polymerizable monomers containing a $CH_2=C<$ terminal group, i.e., a vinylidene group. Included in this class of monomers are the aliphatic conjugated diolefins such as butadiene, isoprene, piperylene, dimethyl butadiene, ethyl butadiene, and the like; aryl olefins such as styrene, alpha-methyl styrene, nuclear substituted styrenes, various alkyl styrenes and the like; and vinyl compounds as acrylonitrile, acrylic acid, methacrylonitrile, vinyl acetate, methyl methacrylate, ethyl acrylate, vinyl chloride, and the like, as well as mixtures of two or more thereof. The method and shortstopping composition of this invention are particularly applicable to the polymerization of monomeric mixtures comprising from 50 to 95% by weight of a butadiene-1,3 and 5 to 50% of a monounsaturated vinylidene compound such as styrene, acrylonitrile, vinyl chloride, methyl methacrylate, vinyl acetate, acrylic acid, and others, as well as mixtures of two or more thereof.

The process of this invention is particularly effective when the monomeric material polymerized is a polymerizable aliphatic conjugated diene having from 4–6 carbon atoms per molecule with lesser amounts of one or more other compounds containing an active $CH_2\!=\!C\!<$ group which are copolymerizable therewith such as aryl olefins. Most preferred are mixtures of 50 to 90% by weight of butadiene-1,3 and 10 to 50% of acrylonitrile or styrene. The products of such copolymerization are high molecular weight copolymers which are rubbery in character and are designated synthetic rubber. Although it is readily apparent that there are a multitude of possible reactants, the most readily and commercially available monomers are 1,3-butadiene and styrene. Our invention will, therefore, be discussed and exemplified with reference to these typical reactants.

The aqueous rubbery polymers can be prepared by a variety of different methods. They may be prepared by any of the conventional aqueous emulsion polymerization methods involving various catalyst systems, such as peroxide catalysts, redox systems, and the like. The latex is preferably prepared by a free-radical induced system as by an aqueous system employing a redox catalyst, i.e., one that employs an oxidant, such as a peroxide or hydroperoxide as diisopropylbenzene hydroperoxide, benzoyl peroxide, tertiary butyl hydroperoxide, methyl cyclohexyl hydroperoxide, cumene hydroperoxide and the like, and an activator, such as a compound of metals such as iron, manganese, copper, vanadium, cobalt and the like. In the case of the activator, it is generally assumed that the metal must be a multivalent metal and in such a condition that it can change its valence state reversibly. The amount of peroxide catalyst may range from 0.001 to 2.0% by weight of the monomers charged. The amount of activator employed is preferably from about 0.5 to about 1.5 moles per mole of peroxide catalyst.

Any suitable emulsifying agent may be utilized, but the preferred agents include the alkali alkyl aryl sulfonates, sulfates of long-chain aliphatic alcohols, water-soluble acid salts of organic bases containing a hydrocarbon chain of 8 to 24 carbon atoms, quaternary ammonium salts, potassium salts of higher fatty acids, potassium salts of rosin acids and the like. These agents are preferably employed in amounts varying from about 0.05% to 2.0% by weight of the aqueous emulsion.

Modifiers are added to make a more plastic, workable polymer under conditions of polymerization. Modifying agents generally employed are preferably sulfur-containing compounds, such as mercaptans, organic sulfides, thio and thionic acids and salts and the like. The aryl and alkyl mercaptans are more generally employed and are preferred. The mercaptans can be used in varying amounts, but are preferably used in amounts varying from 0.001 to 10.0 parts per 100 parts of monomer.

The temperature employed in the polymerization depends upon the particular system selected and is, in general, dependent upon the peroxide catalyst selected. When using the sulfoxylate redox free radical system, for example, it is generally preferred to operate at relatively low temperatures such as, for example, from about −40° F. to 75° or 80° F. Particularly good results are obtained at 41° F. using para-menthane hydroperoxide catalyst.

Peroxides may be used at higher temperatures without the use of an activator. In general, it is then prefererd to polymerize at a temperature of from about 85° F. to about 140° F. Also, when using persulfate-catalyzed systems, a relatively high temperature is generally employed. Good polymerization results were obtained with potassium persulfate at 122° F.

Advantages of our invention are illustrated by the following examples. The reactants, and their proportions, and other specific ingredients of the recipes are presented as being typical and various modifications can be made in view of the foregoing disclosure and discussion, without departing from the spirit or scope of the disclosure or of the claims.

Example I

To illustrate the improved color properties achieved by our invention, an aqueous emulsion of monomeric butadiene-1,3 and styrene for polymerization to produce "hot rubber" was prepared from the following ingredients in the following ratios.

| Components: | Parts/100 parts of monomer by weight |
|---|---|
| Butadiene | 70.5 |
| Styrene | 29.5 |
| n-Dodecyl mercaptan modifier | 0.3 |
| Sodium fatty acid soap | 4.6 |
| NaOH | 0.0086 |
| $K_2S_2O_8$ | 0.32 |
| Water | 180.00 |

The reaction mixture was charged to a polymerization reactor and agitated at a temperature of 122° F. until 68% of the monomers had polymerized. A conversion range of about 45 to 80% may be used with a range of 58 to 70% being preferred. Latex samples were then withdrawn into evacuated bottles containing the shortstop to be evaluated. Sodium dimethyl dithiocarbamate (SDD) in 0.15 part per hundred parts of monomer (p.h.m.) was used as a control to evaluate the shortstops tested. These samples were then agitated at a temperature of 105° F. for ten hours. The percent conversion was determined at the beginning and at the end of this aging period to evaluate the catalyst-destroying ability of the shortstops. Mooney viscosity was performed on the aged samples and compared to the control sample containing 0.15 p.h.m. SDD to evaluate the chain-terminating ability of the shortstop. APHA color was measured on the coagulated polymer from the aged samples and compared to the control sample. All samples used for Mooney and color determinations were stabilized with 1.2% of a non-staining, non-discoloring antioxidant prior to coagulation and drying. Results of the tests wherein sodium dimethyl dithiocarbamate in various amounts, hydrazine, and mixtures thereof, were used as the shortstopping agents were as follows (unless otherwise indicated, quantities are in p.h.m., parts per hundred parts monomer):

| Shortstop | Conversion Rise Above Control, Percent | Mooney Rise Above Control | Color, APHA |
|---|---|---|---|
| 0.15 SDD (control) | 0 | 0 | 79 |
| 0.08 SDD | 2 | 9 | 63 |
| 0.06 SDD | 4 | 18 | |
| 0.04 SDD | 15 | 33 | |
| 0.20 hydrazine | 12 | 18 | 26 |
| 0.20 $N_2H_4$ plus: | | | |
| 0.03 SDD | 0 | 2 | 30 |
| 0.04 SDD | 0 | 0 | 25 |
| 0.06 SDD | 0 | 2 | 23 |
| 0.09 SDD | 0 | 0 | 34 |
| 0.15 SDD | 0 | 2 | 52 |

From the foregoing, it is readily apparent that while 0.15 p.h.m. SDD acts as an effective shortstop, the APHA color is relatively high, and as the amount of SDD is reduced both the catalyst-destroying ability and the chain-terminating ability is appreciably reduced, and at levels below 0.08 p.h.m., SDD does not effectively stop polymerization. It is also noted that while hydrazine exhibited no apparent shortstopping action when used alone up to 0.20 p.h.m., upon the addition of 0.03 p.h.m. SDD, the mixture was an effective shortstop. Thus, it is clear that hydrazine has a synergistic effect upon SDD as an effective shortstopping agent.

Example II

The run of Example I was repeated, employing 0.10 p.h.m. hydrazine with 0.04 p.h.m. SDD and with 0.06 p.h.m. SDD. In both instances effective shortstopping was evidenced by negligible rise in Mooney and conversion above control, while a lighter, improved polymer color (APHA 30) was obtained.

*Example III*

The run of Example I was repeated, employing 0.05 p.h.m. hydrazine with 0.06 p.h.m. SDD and with 0.08 p.h.m. SDD. Again, effective shortstopping action was observed and the resulting polymer was lighter in color; an APHA of 35 and 43, respectively.

*Example IV*

The run of Example I was repeated, employing 0.06 p.h.m. SDD with 0.04 p.h.m hydrazine and with 0.02 p.h.m. hydrazine. The effectiveness of both these mixtures as shortstopping agents was demonstrated by a negligible increase in conversion and a slight increase in Mooney over the control, while producing a polymer with improved color qualities.

The hydrazine shortstops were made up from a commercially produced hydrazine hydrate ("SCAV-OX," a 35% solution of hydrazine in water, manufactured by Olin Mathieson Chemical Corporation). The sodium dimethyl dithiocarbamate (SDD) shortstop solutions were made up from commercial 41% aqueous SDD Vulnopol NM, Alco Oil and Chemical Corporation).

Similar results are obtained by substituting for the sodium dimethyl dithiocarbamate of the examples other alkali metal salts of a dialkyl dithiocarbamic acid, such as the potassium salt, or ammonium salt.

From the above examples, the synergistic effect of hydrazine is obviously apparent. While as much as 0.20 p.h.m. hydrazine exhibited no apparent shortstopping action when used alone, upon the addition of as little as 0.03 p.h.m. SDD, the mixture was an effective shortstop. As noted, SDD used alone at any level below 0.08 p.h.m. did not effectively stop polymerization; however, addition of as little as 0.02 p.h.m. hydrazine to 0.06 p.h.m. SDD produced pronounced shortstopping action. In every instance where a mixture of hydrazine and SDD was an effective shortstop, the resulting polymer was definitely improved and lighter than the SDD shortstopped polymers.

The shortstop compounds may be added separately, in admixture, or in incremental amounts to the polymerization in aqueous solution. Hydrazine may be added in amounts from about 0.01 to 0.03 p.h.m., while the alkyl dithiocarbamate may be added in amounts from about 0.01 to 0.25 p.h.m. The preferred range is 0.02 to 0.20% by weight of hydrazine and 0.03 to 0.15% by weight of the alkyl dithiocarbamate, both substances based on the weight of monomer initially present in the aqueous emulsion. The ratio of hydrazine to the dialkyl dithiocarbamate in the polymerization terminating mixture may be from about 5 to 95% by weight of hydrazine and about 95 to 5% by weight of the dialkyl dithiocarbamate.

The stability of "hot rubber" polymer color during warehouse storage (ambient temperatures) and accelerated aging (122° F.) is also improved by using the new, improved mixed hydrazine-SDD shortstop over SDD alone.

*Example V*

To illustrate the improved color properties under accelerated aging conditions, an aqueous emulsion of monomeric butadiene-1,3 and styrene was polymerized as in Example I. One latex sample was shortstopped with 0.12 p.h.m. SDD while a second sample was shortstopped with 0.20 p.h.m. hydrazine plus 0.04 p.h.m. SDD. The following is a typical accelerated aging study on a typical plant-produced "hot rubber" containing the two shortstops tested:

| Shortstop | Polymer Color, APHA | | |
|---|---|---|---|
| | Initial | After 315 Hrs. at 122° F. | Change |
| 0.12 p.h.m. SDD | 31 | 54 | +23 |
| 0.20 p.h.m. N₂H₄ and 0.04 p.h.m. SDD | 19 | 34 | +15 |

The SDD-shortstopped polymer was markedly degraded in color by accelerated aging, rising 15–30 APHA units in thirteen days at 122° F.; whereas polymer shortstopped with a mixed hydrazine-SDD shortstop rose only 5–20 units.

*Example VI*

To further illustrate the improved color properties achieved by our invention, an aqueous emulsion of monomeric butadiene-1,3 and styrene for polymerization to produce "cold rubber" was prepared from the following ingredients in the following ratios.

Components: Parts/100 parts monomer by weight
- Butadiene — 70.0
- Styrene — 30.0
- Modifier (sulfole) — 0.19
- Paramenthane hydroperoxide — 0.06
- Dresinate 515 — 2.11
- Sodium fatty acid soap — 2.40
- Tripotassium phosphate — 0.37
- Tamol N [1] — 0.01
- Sodium hydrosulfite — 0.025
- Ferrous sulfate heptahydrate — 0.02
- Sodium formaldehyde sulfoxylate — 0.05
- Complexing agent [2] — 0.035
- Water — 184.5

[1] Sodium salt of a condensed polyarylsulfonic acid.
[2] Tetrasodium salt of ethylenediamine tetraacetic caid.

The reaction mixture was charged to a polymerization reactor and agitated at a temperature of 41° F. until about 60% of the monomers had been polymerized. The shortstop evaluation was performed essentially as described in Example I except the latex and shortstop were agitated at 105° F. for 4 hours instead of 10 hours.

The hydrazine-SDD shortstop was found to be an equally effective polymerization-stopping agent for cold SBR polymers, although the color improvement was not so pronounced. (This is thought to be due to the relatively large iron concentration.) The new, improved mixed shortstop is effective for phosphate-activated polymer systems as well as the sulfoxylate type redox systems.

*Example VII*

As a further illustration of the improved properties obtained by our invention, an aqueous emulsion of butadiene-1,3 and acrylonitrile was prepared from the following ingredients in the following ratios.

Components: Parts/100 parts monomer by weight
- Butadiene — 55.0
- Acrylonitrile — 45.0
- Fatty acid soap — 5.0
- Diisopropyl xanthogen disulfide — 0.75
- Hydrogen peroxide — 0.35
- Water — 180.0
- Tamol N [1] — 1.00
- Fe₂(SO₄)₃ — 0.025
- CoCl₂ — 0.00125
- Na₄P₂O₇ — 0.145

[1] See Example VI.

The reaction mixture was charged to a polymerization reactor and agitated at a temperature of 35° C. until about 70% of the monomers had been polymerized. The shortstop evaluation was again performed essentially as described in Example I. Similar improved results were obtained.

We claim as our invention:

1. A process for terminating the polymerization of a monomeric material in aqueous emulsion which comprises polymerizing a monomer mixture consisting essentially of butadiene and styrene in an aqueous emulsion comprising an emulsifier and a catalyst system selected from the group consisting of persulfate-catalyzed and redox sulfoxylated systems, then after the beginning of the polymerization and prior to the completion thereof adding to said emulsion a combination of substances consisting of (1) an alkali metal salt of a dialkyl dithiocarbamic acid and (2) hydrazine, substance (1) being added in amounts of from 0.03 to 0.15% by weight and substance (2) being added in amounts from 0.02 to 0.20% by weight, both substances based on the weight of monomer initially present in said emulsion.

2. A process for terminating the polymerization of a monomeric material in aqueous emulsion which comprises polymerizing a monomeric mixture consisting essentially of butadiene and styrene in an aqueous emulsion comprising an emulsifier and a catalyst system selected from the group consisting of persulfate-catalyzed and redox sulfoxylated systems, then after the beginning of the polymerization and prior to the completion thereof adding to said emulsion a combination of substances consisting of (1) an alkali metal salt of a dialkyl dithiocarbamic acid and (2) an aqueous solution of hydrazine, substance (1) being added in amounts of from 0.03 to 0.15% by weight and substance (2) being added in amounts of from 0.02 to 0.20% by weight, both substances based on the weight of monomer initially present in said emulsion.

3. A process as in claim 2 wherein the alkali metal salt of a dialkyl dithiocarbamic acid is sodium dimethyl dithiocarbamate.

4. A process as in claim 2 wherein the monomer mixture contains from 50 to 90% by weight of 1,3-butadiene and from 10 to 50% by weight of styrene.

References Cited in the file of this patent

UNITED STATES PATENTS

| | | |
|---|---|---|
| 2,697,079 | D'Alelio | Dec. 14, 1954 |
| 2,794,011 | Beber | May 28, 1957 |
| 2,876,214 | Wheelock | Mar. 3, 1959 |

OTHER REFERENCES

Industrial and Engineering Chemistry, vol. 45, No. 1, January 1953, pages 182–186.